April 23, 1929.　　　A. H. SORENSON　　　1,710,122
IMPLEMENT TRANSPORT TRUCK
Filed Feb. 10, 1927　　　4 Sheets-Sheet 1
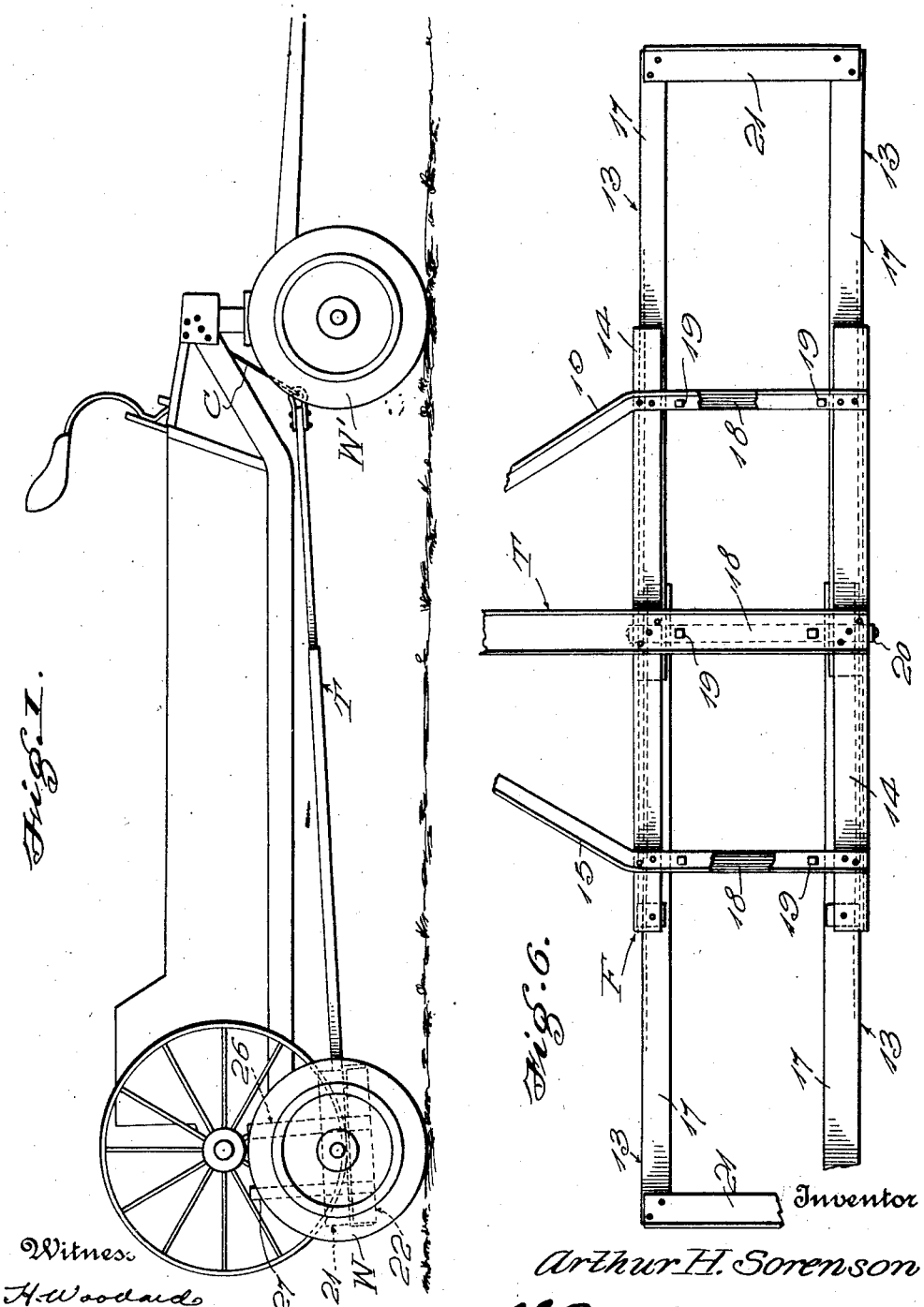

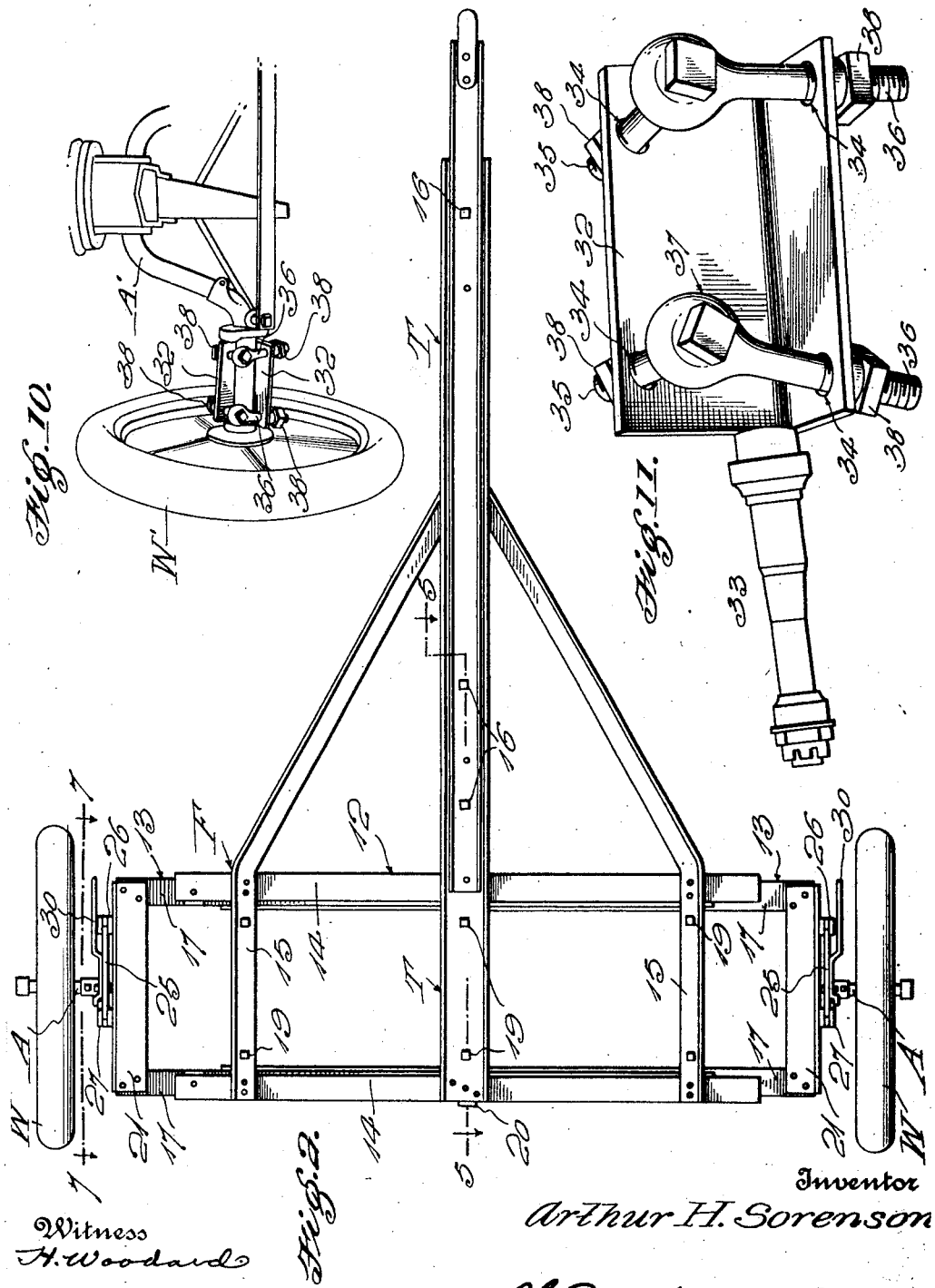

April 23, 1929.    A. H. SORENSON    1,710,122
IMPLEMENT TRANSPORT TRUCK
Filed Feb. 10, 1927    4 Sheets-Sheet 3
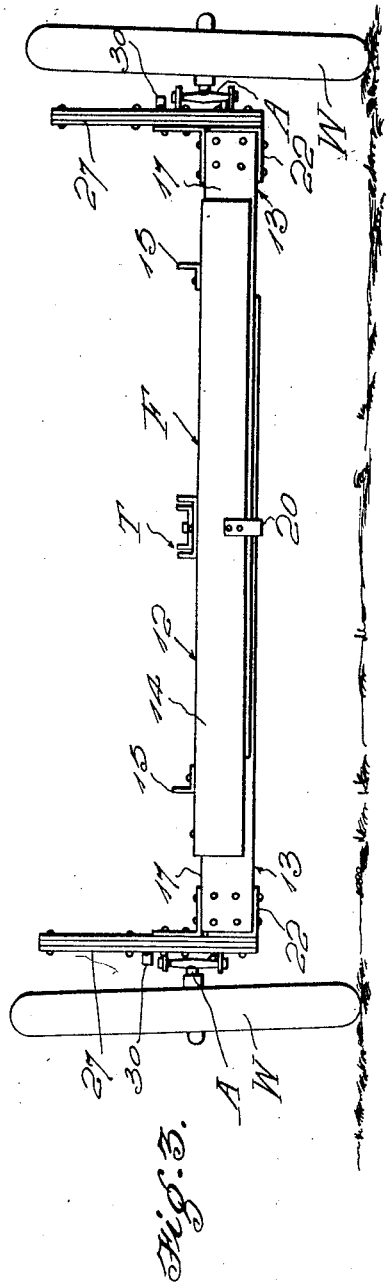
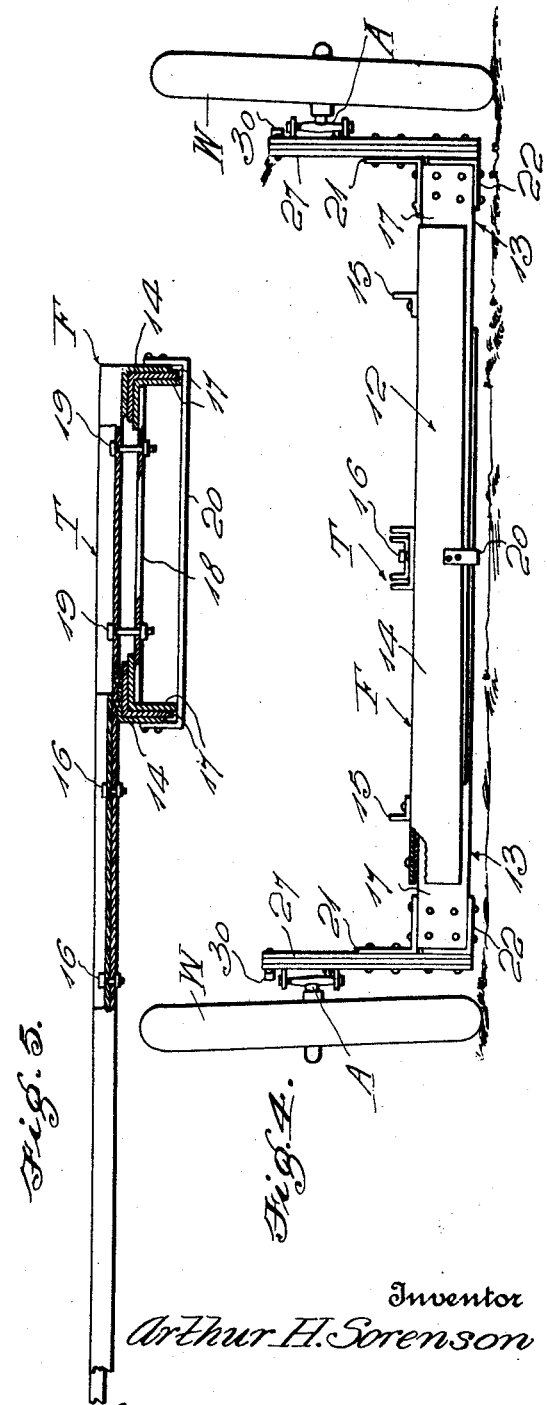
Witness
H. Woodard
Inventor
Arthur H. Sorenson
By H. B. Wilson &co
Attorneys

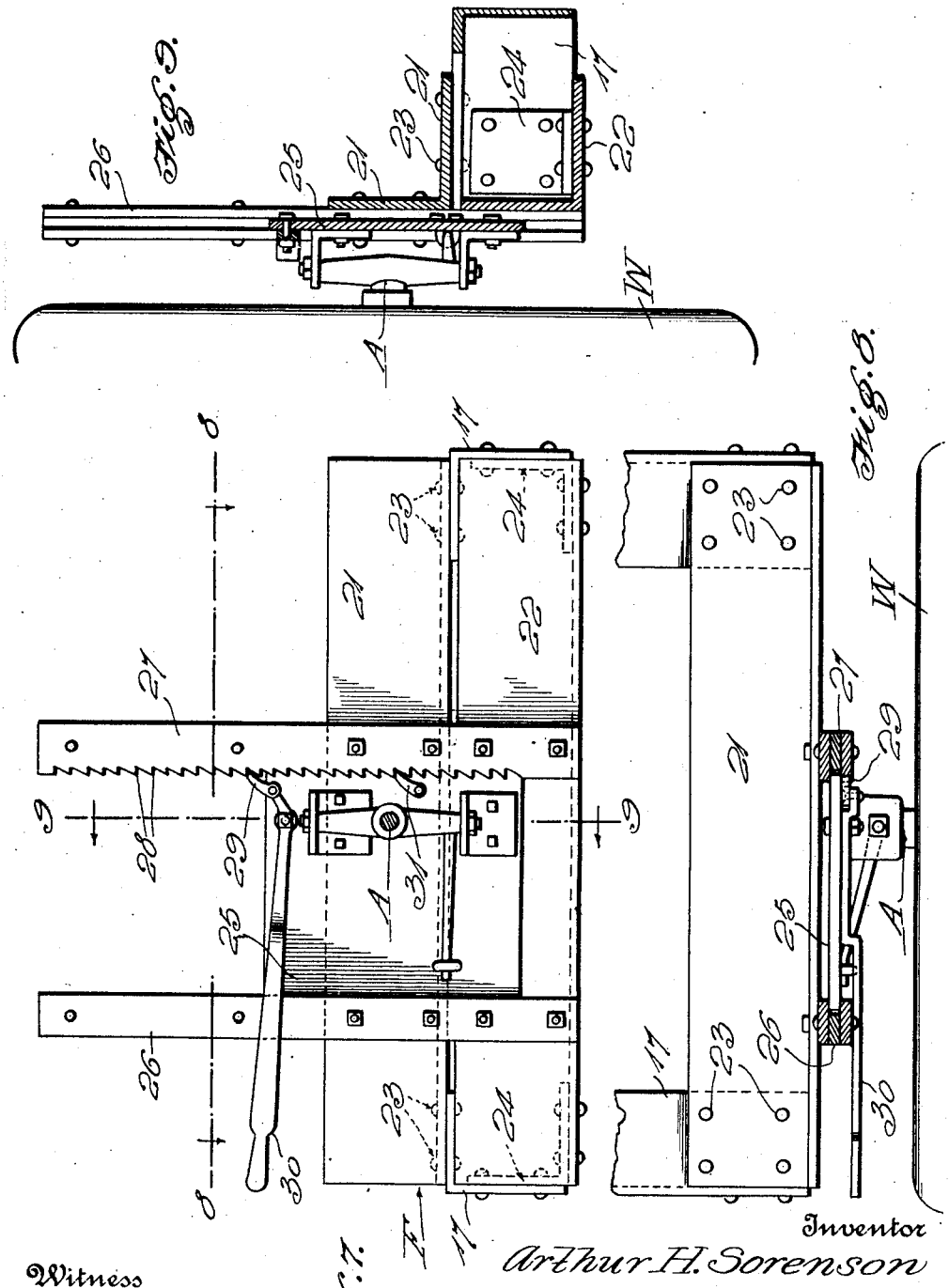

Patented Apr. 23, 1929.

1,710,122

UNITED STATES PATENT OFFICE.

ARTHUR H. SORENSON, OF ORTONVILLE, MINNESOTA.

IMPLEMENT-TRANSPORT TRUCK.

Application filed February 10, 1927. Serial No. 167,196.

The invention aims to provide a new and improved truck or trailer structure which is well adapted for transporting farm implements and the like from one place to another, the truck being well adapted for use in the delivery of farm implements which have been purchased at rather remote points.

The device is of such nature that it and its load may be towed behind an automobile or motor truck or tractor at a speed of from ten to twenty-five miles per hour, the truck being preferably rubber tired to permit rapid towing without danger of injuring the implement being carried.

Further objects of the invention are to provide a truck or trailer of novel construction which is readily adjustable for carrying implements of different widths; to provide unique means whereby the implement-receiving frame of the truck may be readily raised and lowered to allow easy loading and unloading, and to provide novel means permitting the quick and easy substitution of resilient tired wheels for the front wheels of any wheeled implement when the latter is to be transported, the rear wheels of said implement being then supported upon the truck.

With the foregoing and minor objects in view, the invention resides in the novel subject matter hereinafter described and claimed, the description being supplemented by the accompanying drawings.

Fig. 1 is a side elevation showing the manner in which the invention may be used for transporting four-wheeled implements, such as spreaders.

Fig. 2 is a top plan view of the truck.

Fig. 3 is a rear end view illustrating the frame structure raised.

Fig. 4 is a similar view showing the frame structure lowered for easy loading or unloading.

Fig. 5 is a longitudinal section partly in elevation, as indicated by line 5—5 of Fig. 2.

Fig. 6 is a top plan view partly broken away and with parts removed, showing parts of the frame structure laterally extended to a greater width than in Fig. 2.

Fig. 7 is a side elevation partly in section as indicated by line 7—7 of Fig. 2.

Figs. 8 and 9 are sectional views on the planes indicated by lines 8—8 and 9—9 of Fig. 7.

Fig. 10 is a perspective view illustrating the manner in which a resilient tired wheel may be substituted for one of the wheels of an implement.

Fig. 11 is an enlarged perspective view illustrating the stub axle which carries the wheel of Fig. 10 and also showing the means for connecting this stub axle with an axle of the implement.

The truck embodies a horizontally disposed frame F supported for vertical adjustment by wheels W and provided with a tongue T.

The frame F embodies a central section 12 and two side sections 13 slidably engaged therewith, said central section having front and rear bars 14 of angular cross section, to which bars, the tongue T and braces 15 for said tongue, are riveted or otherwise secured. Preferably, the tongue is formed of slidably engaged sections so that it may be extended to any desired length and then secured by bolts or the like 16, and it will be understood that it is only the rear section of this tongue which is secured to the bars 14.

Each side section 13 of the frame F embodies front and rear parallel bars 17 of angle metal, disposed in nested and slidable relation with the bars 14, and to clamp these bars 14 and 17 together, regardless of the width to which the frame F is extended, I provide clamping bars 18 which underlie the portions of the tongue T and the braces 15, connecting said bars 14, clamping bolts 19 being passed through said bars 18 and the overlying tongue and brace portions, to draw said bars into tight contact with the lower sides of the lowermost of the bars 17, thus clamping these bars tightly to the bars 14. Preferably, under the central clamping bar 18, a brace bar 20 is disposed, this bar having its ends bent upwardly and secured to the bars 14.

At their outer ends, the bars 17 of each frame section 13 are connected by upper and lower angle metal bars 21 and 22 which are disposed longitudinally of the truck and are suitably secured. Preferably, the bars 21 are riveted to the horizontal flanges of the bars 17, as indicated at 23, while brackets 24 riveted to the vertical flanges of said bars 17, are employed to secure the bars 22. The rear wheels and in some instances the only wheels of an implement to be transported, are intended to be run upon the bars 21 and are supported thereby while the machine is being drawn from one place to another. When the frame F is lowered, the implement wheels may well be run onto the bars or tracks 21 and then the frame F may be raised to produce the necessary road clearance. When a destination is reached, the frame F may be again lowered and the implement easily run from the tracks or bars 21.

When hauling certain kinds of implements, wheels thereof may rest directly upon the bars 17 and said wheels will not only be supported by said bars, but will be chocked by the latter against tendency to roll either forwardly or rearwardly. By inwardly adjusting the frames 13 to the desired extent, the longitudinal frame members 21 may be placed against the outer sides of the wheels resting on the bars 17, thus holding the implement against any tendency to shift transversely of the trailer. In other instances, it is possible that the wheels of an implement being hauled may rest directly upon the end portions of the bars 14, the wheels being held against shifting either by contact with the tongue braces 15, with the bars 21, or both.

The wheels W, above referred to, are mounted in any desired manner upon stub axles A, and these axles are suitably secured to a pair of vertical plates 25. These plates are provided with vertical edges which are slidably engaged by vertical guide tracks 26 and 27, which tracks are bolted or otherwise secured to and rise from the bars 22 and 23. The tracks 27 are provided with teeth 28 co-operable with pawls 29, which pawls are pivoted to levers 30 fulcrumed upon the plates 25. Dogs 31 also pivoted to the plates 25, are co-operable with the teeth 28. By properly manipulating the levers 30, the entire frame F may be raised to the desired extent and the dogs 31 will hold said frame in raised position. Also, by proper manipulation of the levers 30 and dogs 31, the frame may again be lowered. Thus, it will be seen that effective jack means have been provided to effect lowering of the frame for easy loading or unloading and to effect raising of the frame for necessary road clearance.

When a four-wheeled implement is to be transported and its rear wheels can be supported by the truck, as shown in Fig. 1, resilient tired wheels W' may be substituted for the front wheels of the implement. To accomplish this, I make the provision shown in Figs. 10 and 11. In these views, 32 designates a length of angle steel or the like provided with a stub axle 33 for the wheel W', the side flanges of said length of angle steel or the like 32, being formed with bolt holes 34. Bolts 35 and 36 are provided with threaded ends passed through these openings, and the inner ends of these bolts are suitably connected as indicated at 37. This connection is preferably established by providing the bolts 36 with eyes through which the bolts 35 pass loosely. The ends of an axle A' of the implement, may be effectively held in the angles of the two members 32 by tightening the nuts 38 on the bolts 35 and 36 and hence the wheels W' will be effectively connected with the axle A'.

When a four-wheeled implement is to be towed, with the wheels W' substituted for its front wheels as in Fig. 1, the tongue T may be connected with a part of the implement by a chain or the like C. When two wheeled implements are to be transported, the tongue T is of course connected to the machine which is to do the towing.

By the use of my invention, I am enabled to tow practically all kinds of farm implements at a speed far above that at which they could be safely towed upon their own metal wheels. A number of the four-wheeled implements which may be effectively transported by the invention are spreaders, corn shellers, grain elevators, portable engines, wagons, light tractors and ensilage cutters. Moreover, without the use of the wheels W', machines such as the following may readily be towed:—grain binders, corn binders, grass mowers, side delivery rakes, hay loaders, hay stackers, plows, harrows, corn and cotton planters, listers, riding cultivators, potato planters, sprayers, potato diggers, etc.

As a unit by itself, the parts shown in Figs. 10 and 11 may be effectively used on the standard axles of grain binders, cotton planters, potato planters, tractor plows, grain elevators, corn shellers, portable engines, sulky hay rakes, hay loaders, mowers, etc.

Excellent results have been obtained from the general construction shown and described, and such construction is therefore preferably followed. However, within the scope of the invention as claimed, variations may of course be made.

What is claimed is:

1. In an implement transport truck, a frame section having parallel bars of angular cross section, and a connecting bar secured to the upper sides thereof, a second frame section having parallel bars slidably engaging the lower sides of the first named bars in the angles thereof, a clamping bar underlying the aforesaid connecting bar and disposed at the lower sides of the second named bars, and bolts passing through said connecting bar and said clamping bar for drawing the latter to a position at which it tightly clamps the slidably engaged bars together.

2. In an implement transport truck, a frame section having parallel bars and a connecting bar secured to the upper sides thereof, a second frame section having parallel bars slidably engaging the lower sides of the first named bars, a clamping bar underlying the aforesaid connecting bar and disposed at the lower sides of the second named bars, and bolts passing through said connecting bar and said clamping bar for drawing said parallel bars and said clamping bars into tight contact.

3. In a trailer for transporting a wheeled implement along a highway, two laterally spaced road wheels having stub axles, two lifting jack structures mounted on the inner ends of said stub axles, longitudinal frame members supported for vertical adjustment by said jack structures and of rigid nature from their front to their rear ends, straight front and rear frame members extending transversely between and secured to the ends of said longitudinal frame members, said transverse frame members being disposed in spaced parallel relation to jointly support and chock wheels of certain kinds of implements to be carried by the trailer; said front and rear frame members being formed of slidably connected sections to permit said longitudinal frame members to be disposed against the outer sides of wheels resting on said front and rear frame members, and releasable means for normally holding said sections against relative sliding.

4. In a trailer for transporting a wheeled implement along a highway, two laterally spaced road wheels having stub axles, two lifting jack structures mounted on the inner ends of said stub axles, longitudinal frame members supported for vertical adjustment by said jack structures and of rigid nature from their front to their rear ends, straight front and rear frame members extending transversely between and secured to the ends of said longitudinal frame members, said transverse frame members being disposed in spaced parallel relation to jointly support and chock wheels of certain kinds of implements to be carried by the trailer, said longitudinal frame members being upwardly exposed throughout their lengths and constituting tracks to support wheels of other kinds of implements; said front and rear frame members being formed of slidably connected sections to permit said longitudinal frame members to be disposed against the outer sides of wheels resting on said front and rear frame members, and releasable means for normally holding said sections against relative sliding.

5. In a trailer for transporting a wheeled implement along a highway, two laterally spaced road wheels having stub axles, two lifting jack structures mounted on the inner ends of said stub axles, longitudinal frame members supported for vertical adjustment by said jack structures and of rigid nature from their front to their rear ends, and straight front and rear frame members extending transversely between and secured to the ends of said longitudinal frame members, said transverse frame members being disposed in spaced parallel relation to jointly support and chock wheels of certain kinds of implements to be carried by the trailer, said longitudinal frame members being secured upon the upper sides of the transverse frame members, said transverse frame members consisting of slidably connected sections and means for holding them in adjusted position, permitting variance of the width of the trailer and allowing said longitudinal frame members to be positioned to abut the outer sides of the implement wheels.

6. An implement transport truck comprising a central frame section having front and rear parallel transverse bars, a tongue secured to the centers of both of said bars and tongue braces laterally spaced from the tongue at their rear ends and also secured to both of said bars to hold them in fixed parallel relation; two outer frame sections comprising front and rear parallel bars and outer longitudinal frame members secured to these parallel bars and of rigid nature throughout their lengths; means adjustably securing the front and rear bars of said outer frame sections to the corresponding bars of said central section, lifting jack structures supporting said longitudinal frame members for vertical adjustment, stub axles supporting said lifting jack structures, and ground wheels on said stub axles.

7. In a trailer for transporting implements, two laterally spaced road wheels, two stub axles upon which said wheels are mounted, two parallel vertical plates secured to the inner ends of said stub axles, a pair of vertical tracks at the inner side of each of said wheels, said tracks slidably engaging front and rear edges of said plates, an upper and a lower longitudinal bar at the inner side of each of said wheels and rigidly secured to the lower ends of said tracks, said upper bars having horizontal flanges constituting supports for wheels of an implement to be carried, transverse frame members extending between and secured to said upper and lower longitudinal bars, a tongue secured to said transverse frame members, and means for holding the aforesaid tracks with respect to the above-named plates when the frame has been vertically set at desired position.

In testimony whereof I have hereunto affixed my signature.

ARTHUR H. SORENSON.